United States Patent [19]
Feinberg

[11] 3,821,015
[45] June 28, 1974

[54] HEAT-RESISTANT, VAPOR BARRIER RELEASE COATING

[75] Inventor: Robert S. Feinberg, Teaneck, N.J.

[73] Assignee: Chyplex Industries, Inc., Flushing, N.Y.

[22] Filed: Sept. 7, 1972

[21] Appl. No.: 286,966

[52] U.S. Cl............. 117/47 A, 117/47 H, 117/60, 117/95, 117/138.8 F, 117/155 R, 117/161 P, 229/3.1
[51] Int. Cl............................................. B44d 1/092
[58] Field of Search............... 99/171 LP, 192 P; 117/47 A, 47 H, 95, 138.8 A, 138.8 F, 161 P, 155 R, 60; 260/30.2, 78 TF; 229/3.1

[56] References Cited
UNITED STATES PATENTS

| 2,708,645 | 5/1955 | Norman | 229/3.1 X |
| 2,972,553 | 2/1961 | Hess | 117/47 |
| 3,151,989 | 10/1964 | Sacks et al. | 99/171 |
| 3,392,144 | 7/1968 | Holub | 260/46.5 |
| 3,534,003 | 10/1970 | Holub et al. | 117/161 X |
| 3,598,784 | 8/1971 | Holub et al. | 260/46.5 |
| 3,598,785 | 8/1971 | Holub et al. | 260/46.5 |

*Primary Examiner*—William D. Martin
*Assistant Examiner*—M. R. Lusignan
*Attorney, Agent, or Firm*—Howard C. Miskin

[57] ABSTRACT

A food-heating utensil is formed of a heat responsive gas or vapor releasing material such as paper or a thermoset cross-linked polyester substrate coated or encapsulated with a polysulfone or polyamide-imide resin, and is characterized by the substantial absence of any gas or vapor release at high temperatures.

5 Claims, 2 Drawing Figures

PATENTED JUN 28 1974

3,821,015

INVENTOR.
ROBERT S. FEINBERG

BY Howard C. Miskin

ATTORNEY

HEAT-RESISTANT, VAPOR BARRIER RELEASE COATING

REFERENCE TO RELATED APPLICATION

The present application is a continuation-in-part of copending application Ser. No. 49,787 filed June 25, 1970, now abandoned.

BACKGROUND OF THE INVENTION

The present invention relates generally to improvements in products of paper and synthetic organic resins and it relates more particularly to an improved cooking utensil structurally formed of paper or synthetic organic resins, which release gas or vapors at elevated temperatures.

It is a common practice to merchandise, dispense, or package foods in a disposable cooking or heating utensil which serves as an eating receptacle or plate as well, so that the food, even if frozen, may be dispensed and heated in the utensil by baking, high frequency cooking or otherwise and the heated, cooked food served in the utensil directly to the consumer. These utensils must withstand maximum cooking temperatures without damage to the utensil or the food and without in any way adversely affecting the food such as by imparting undesirable tastes or odors thereto or by adversely affecting its palatability and nutritional value. Moreover, the utensil should be available in any desirable configuration, with or without partitions and with or without covers, should be of a highly attractive appearance and of any desirable color and texture, and should be very inexpensive so as to permit its use as a disposable or throw-away article without significantly affecting the end cost of the cooked food-stuff. These utensils have many uses, such as in the preparation and service of in-flight meals, packaged frozen dinners, and the like. Where the utensil contains frozen food, it must withstand thermal shock or going from below 0° F. to 350° to 450° F.

It has been found that the use of paper or a thermoset cross-linked polyester resin for a cooking utensil offers many advantages. They are strong and can withstand high temperatures without damage or deterioration; they are relatively inexpensive, highly attractive and can be formed into any desired configuration by conventional techniques. While these paper and polyester cooking utensils possess many advantages, in most applications they possess important drawbacks when they are used to heat or cook food at relatively high temperatures, where the food is exposed to or in contact with the paper or polyester utensil. The food may stick to the utensil and may acquire a slight taste or odor which detracts from its palatability and hence limits the use of paper or polyester for cooking utensils as well as for other high temperature applications.

SUMMARY OF THE INVENTION

It is a principal object of the present invention to provide an improved article formed of paper or a synthetic organic polymeric resin or resins.

Another object of the present invention is to provide an improved heat resistant article formed of paper or synthetic organic polymeric resin or resins in which the evolution or release of gases or vapors is substantially obviated.

Still another object of the present invention is to provide an improved heating and serving utensil which does not in any way adversely affect the food consequent to the heating of the utensil and provides excellent food release properties.

A further object of the present invention is to provide an improved article of the above nature characterized by its versatility, adaptability, low cost, attractive appearance and ease of production.

The above and other objects of the present invention will become apparent from a reading of the following description taken in conjunction with the accompanying drawing, which illustrates a preferred embodiment thereof.

It has been found that articles which are formed of polymeric resin compositions which release gases and vapors when heated, particularly the thermoset cross-lined polyester resins where unreacted monomers are vaporized by heat and where volatiles caused by the degradation of the polyester resin or resins may likewise be released, when coated with a layer of a polyamide-imide or a polysulfone resin, do not release such gases and vapors and may thus be employed where their use by reason of such gases and vapors would possess undesirable drawbacks. It has been found that in addition to these resins, paper products likewise release undesirable vapors and gases when heated, and such gas and vapor release is inhibited when the paper or resin product is coated with a polyamide-imide or polysulfone resin or mixture thereof. The polyamide-imide or polysulfone coatings not only function as impermeable gas and vapor barriers, but are themselves highly stable, odorless, relatively scratch-resistant, highly craze-resistant, exhibit the ability to adhere to the polyester or paper substrate, and when supported by the substrate are highly dimensionally stable under heat and provide excellent food-release properties. Moreover, the substrate-supported coating is highly resistant to thermal shock, so that the utensil containing the food can be taken directly from the freezer and placed in an oven or from an oven into ice water.

Accordingly, the present invention contemplates the provision of a heat-resistant, vapor-free, paper or synthetic organic polymeric article, comprising a heat-responsive, vapor-releasing paper or organic polymeric resin substrate having a coating formed of a polyamide-imide or a polysulfone resin or a combination thereof. The improved article is advantageously a food heating or baking utensil which may also function as a service receptacle, and the substrate is advantageously paper or a thermoset cross-linked polyester resin, and the coating advantageously fully envelops the substrate and is of a thickness between ½ mil and 15 mils.

The improved article may be used to heat and bake all types of food, including frozen food, without imparting any undesirable taste or odor thereto, or adversely affecting the palatability or nutritional value of the heated food. The article is inexpensive, of attractive appearance, has excellent food-release characteristics, and may be produced in any desired shape by the use of conventional equipment and techniques.

DESCRIPTION OF THE PREFERRED EMBODIMENT

Figure 1:
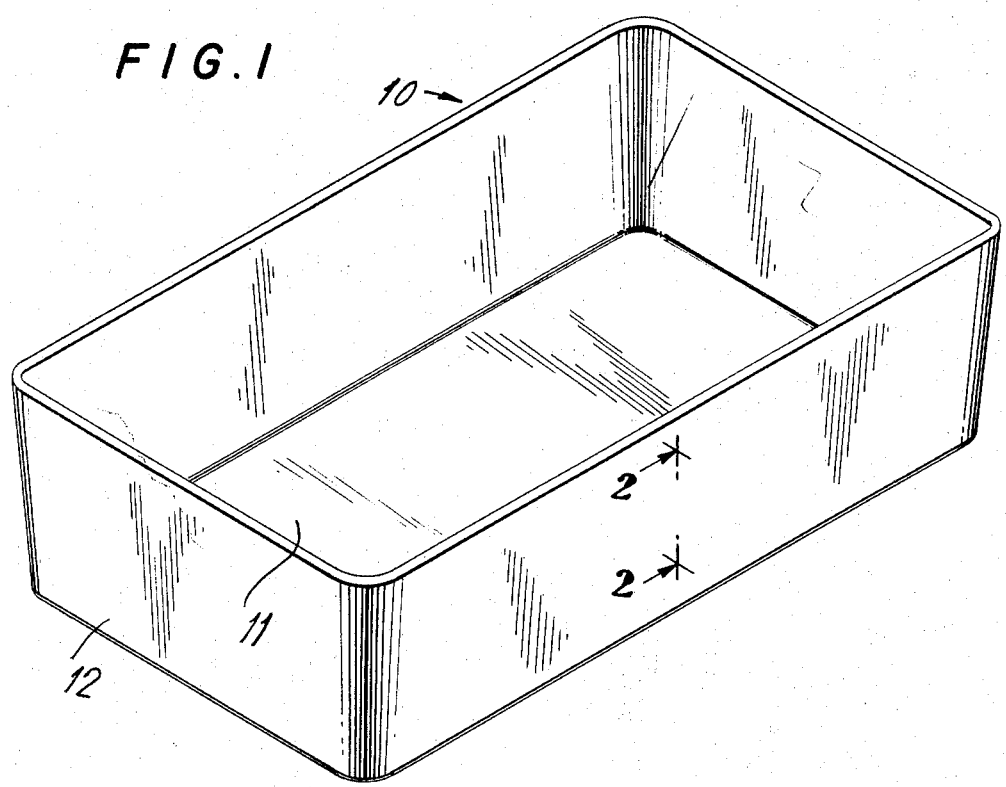
FIG. 1 is a top front perspective view of a preferred embodiment of the present invention.
Figure 2:
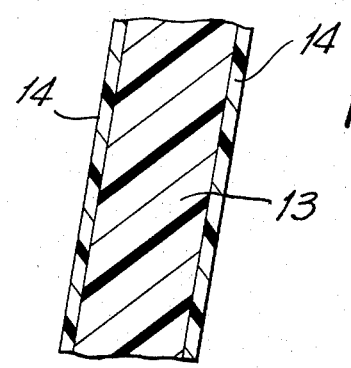
FIG. 2 is an enlarged fragmentary sectional view taken along line 2—2 in FIG. 1.

Referring now to the drawing which illustrates a preferred embodiment of the present invention, the reference numeral 10 generally designates the improved article which is illustrated merely by way of example as an open-topped deep rectangular heating dish or tray, it being understood that the article 10 may assume any desired shape and size, with or without a cover. The dish 10 includes a flat, round-cornered rectangular base wall 11 and integrally formed front, rear and end walls 12 flaring upwardly and outwardly from the peripheral of base 11 and joined by rounded corners.

The body or main structural core of the article 10 is defined by a structurally self-supporting, integrally formed paper or polyester resin substrate 13, which is completely covered along the opposite faces and edges thereof by an adherent layer 14 of a polysulfone or polyamide-imide resin which advantageously completely envelops or encapsulates substrate 13.

Any of the polyester molding compounds which are substantially heat-resistant to temperatures of about 450° F. to 500° F., and which are structurally stable at these temperatures, may be employed for the substrate 13 and the body member or core may be molded and formed in the manner earlier described. Where the substrate 13 is formed by liquid thermoset injection molding techniques, the base resins for the polyester system can be made from the saturated acids, such as phthalic acid, used in the phthalic anhydride form due to its availability, isophthalic acid, and terphthalic acid. Unsaturated acids that can be used in the preparation of the polyesters, which are suitable for liquid thermoset injection are the cis-trans isomers of maleic anhydride and fumaric acid. In addition, some principal alcohols suitable for the polyester synthesis for liquid thermoset injection processes are the gylcols containing two hydroxal groups. However, monohydric alcohols, to terminate chain growth and polyhydric alcohols for branching in the polyester chain and for increasing molecular weight, can also be employed. Dual resin systems cross-linked with various monomers for quick cure, high hot strength, suitable tensile strength, tack-free surface, long pot life, dimensional stability and shrink resistance are also employed. These monomers vary and could be any of the following or any combination of the following: methyl methacrylate, styrene, vinyl toluene, alpha methyl styrene, divinly benzene, dichloro-styrene, diallyl phthalate, triallyl cycanurate, tertiary butyl styrene, and any other suitable cross-linking monomer for a polyester system.

Suitable catalysts for these systems include singularly and in combination many of the well-known catalysts, such as benzoyl peroxide, tertiary butyl perbenzoate, tertiary butyl peroctoate, tertiary butyl hydro-peroxide, and others. Also added to polyester systems are a variety of fillers and modifiers that are added in greater or lesser amounts to produce the desired end properties. Suitable additives range from various kinds of silicas, milled fiberglass, fiberglass roving, pigments, and hydrated alumina, to asbestos, wood pulp, liquid extenders, plasticizers, and may other types of modifiers.

Where the substrate 13 is formed of paper, it may be produced in any suitable manner and thickness and is preferably of a cellulosic fiber and fabricated by conventional techniques, for example, molded from a slurry of shapeable mass or otherwise produced. The coating 14 is formed of a polyamide-imide or polysulfone resin.

Amide-imide polymers are aromatic resins thermally cured to form poly-amide-imides. They are based upon tri-mellitic anhydride and are linear homopolymers. The poly-amide-imides are available in a variety of grades and forms, namely powders, granules, solutions and molded pieces. The granule or powder form has been found to be most suitable for the present coating applications. Amide-imide granular or powdered material dissolved in N-Methyl-2-Pyrrolidone (NMP) in a range from 25 percent solid amide-imide content down to lower than 1 percent amide-imide solid content, has been found suitable.

A representative solution for spraying and/or dipping would be a solution of 10 percent poly-amide-imide by weight and 90 percent NMP by weight. The polyester product to be coated is advantageously heated to 225° F. for 15 minutes, dipped or sprayed with the amide-imide solution and then the solvent driven off in an oven at 250° F. for 20 minutes. Then for the final curing of the coating the product is permitted to remain in the oven for approximately another 30 minutes at about 450° F. The resulting coating would functionally perform according to the requirements set forth above. Higher curing temperatures of the amide-imide coatings can be employed depending upon the ability of the substrate material to withstand high heat. Final mil thicknesses of from about ½ mil to about 15 mils are suitable depending on the temperature to be used and the duration the article is intended to remain at that temperature.

The amide-imide polymer resins can be pigmented in a variety of colors ranging from yellow to blue to red to cream and others. Low concentrations of unpigmented straight poly-amide-imide resins produce coatings that are very light amber in color. Although poly-amide-imide resins will adhere to a smooth polyester surface, preparation of the substrate with a chemical preparative, such as a thermosetting acrylic, or simply roughening the surface of the product to be coated or the mold used to form the product, will create an improved adhesion to the substrate, Chemical etching of the base material can also be used to increase the adhesion of amide-imide coatings.

Other solvents may be added to a solution of the poly-amide-imide resin and NMP to serve as dilutents to the solvent. Such solvents can be known organic solvents such as trichloroethylene, methyl-ethyl ketone, toluene, acetophenone, tetrahydrofuran, cyclohexanone, dimethyl formamide (DMF), and others. These solvents modify the drying time of the coating and can aid in producing quicker tack-free surfaces and varying degrees of gloss. Amide-imide powder suitable for making coating solutions as described above is commercially supplied by Amoco Chemicals Corp., Chicago, Ill.

The polysulfone resins may be employed for the coating in place of the poly-amide-imide resins.

Polysulfone is commercially supplied in pellet form and in the natural state is light amber in color. Pigmented polysulfone is also available in white, blue, reddish brown, and other colors and may be advantageously used as well. The raw pellets as supplied by the manufacturer contain an excess amount of residual solvent causing a definite obnoxious pungent odor to the compound. This odor must be eliminated before the pellets would be suitable for the present coating process. It has been found that the residual solvent may be advantageously eliminated from the polysulfone resin by boiling the pellets in water, for example, for 1½ hours, draining the wash water, and thereafter heating the pellets in thin layers, preferably of about ½ inch or less in an exhaust oven, for example, for four hours at 350° F. The thus treated pellets are dry, free of residual solvent and odorless, and still retain their physical properties.

The washed, dried pellets prepared as above are dissolved in any of the following solvents: acetophenone, chloroform, cyclohexanone, chlorobenzene, DMF, dioxane, methylene chloride, NMP, tetra-hydrofuran, and other suitable solvents. These solvents produce resin solutions from very low solid concentrations up to approximately 30 percent solids by weight. In addition to the solvents mentioned, solvent blends serving as solvent diluents can also be employed and these blends may contain toluene, cyclohexanone, acetone, xylene, trichloroethylene and other suitable organic solvents. The solvents and solvent diluents can be added in any number of ratios that appear to be suitable for the present coating application. For air spraying, 88 percent of DMF and 12 percent polysulfone by weight has produced a successful solution. However, trichloroethylene, cyclohexanone, and other solvents and diluents as mentioned above have been added to polysulfone solutions and have been found to be highly acceptable. What solution is employed depends upon the functional application and the required esthetics of the finished plastic product, and may be easily and readily determined.

Another technique that has been used successfully for the application of polysulfone coatings is airless spraying. Coatings applied to the substrate by an airless spray gun are very smooth, shiny, and uniformly deposited. In addition to the qualities of polysulfone coatings discussed above, these coatings also prevent the staining of the substrate material under high heat. A representative coating solution comprises (by weight): 12 percent polysulfone, 68 percent DMF, 20 percent trichloroethylene and to this solution is added 8/10 of 1 percent surfactant wetting agent TRITON CF-21 or X-45, both manufactured by Rohm and Haas Co. of Philadelphia, Pa. The concentration of polysulfone, DMF, and other suitable agents can be varied over a fairly wide range to produce a variety of esthetic qualities of coatings within the framework and limitations of the particular end use of the coated article. Prior to airless spraying, the articles are preheated to a temperature of approximately 225° F. and then sprayed and immediately placed in an oven or in a heated environment at a temperature of approximately 225° F. until dry to the touch. The coating is then subjected to higher temperatures up to approximately 400° F. until satisfactory drying has been completed. Other polysulfone solutions used in air or airless spraying contain polysulfone in the range of about 1 percent to about 20 percent.

Although any number of dipping techniques may be successfully employed, one technique found to be highly suitable is to dip the molded polyester substrate heated from 200° F. to 325° F. in a solution of 6 percent polysulfone and 94 percent DMF. The dipped article is withdrawn from the dip solution and placed in the oven at approximately 300° F. to 350° F. for about 10 minutes. The piece is removed from the oven, redipped while heated in the 6 percent polysulfone solution, and placed in the oven again at about 300° to 350° F. for about ten minutes. Other solutions containing from about 1 percent to about 30 percent polysulfone can be used depending on the application.

The polyester articles that are dipped can be heated or at room temperature, depending upon the application and depending upon the esthetics required. It has been found that room temperature dipping of the molded polyester article tends to produce a more shiny, glossy, esthetically pleasing coating. Also, there is a distinct relationship between the drying time of the solvent and the esthetics of the finished coating. The heat from the oven tends to serve two purposes. These purposes are (1) to drive the solvent system from the coating, and (2) to heat-solidify the surface of the coating and to create good adhesion to the substrate material. The temperature of the molded polyester plastic product to be dipped or sprayed, the present polysulfone solids in either a dipping solution or spraying solution, the rate of withdrawal of the product from the dipping tank, the length of time a plastic product is to be sprayed, the solvent mixtures made from any combination of solvents discussed above, the number of times the product is to be dipped or sprayed, and the length of time and the temperature to which the various coatings are to be subjected, are all variables which are adjusted depending on the end use application of the finished plastic product. Coating thicknesses of from about ½ mil to about 15 mils are highly suitable for the present purpose, with the coating thickness depending on the temperature range of the end use. Polysulfone pellets are commercially available from Union Carbide Corp.

Also, in some applications, the article may be fully coated with poly-amide-imide, such as by dipping, and a coating of polysulfone applied to the surface contacting the food. In low heat applications, such as microwave heat, only the surface contacting the good need be a polysulfone or a poly-amide-imide resin.

Another form of this invention would be to encapsulate the substrate with the selected material. An upper and lower surface made of polysulfone or poly-amide-imide is thermoformed or pressure formed, respectively, to make a close fit with the substrate and the edges sealed in any convenient manner, such as heat-sealing, welding or using adhesive and the like.

While polyester substrates were discussed in the specific embodiments, other plastic substrates could be used, such as epoxy, polycarbonate, nylons, polyphenylene oxide, While there has been described and illustrated preferred embodiments of the present invention, it is apparent that numerous alterations, omissions and additions may be made without departing from the spirit thereof.

What is claimed is:

1. In a process of improving the vapor barrier characteristics of a food containing cooking utensil exposed to temperatures as high as about 450° F., the steps which comprise:

a. forming a cooking utensil from a structurally self-supporting paper or a thermoset cross-linked polyester resin composition which is heat resistant and structurally stable at temperatures of about 450° to about 500° F.;

b. treating at least the surface of said cooking utensil that contacts the food to be placed in said cooking utensil with a non-aqueous solution comprising a solvent containing a linear polyamide-imide homopolymer resin soluble in said solvent to provide a coating on said surface between about ½ to 15 mils of said polyamide-imide resin; and c. heating said coated surface to a temperature sufficient to dry said coating, said coating providing a substantially impermeable barrier against vapors released from said paper or cross-linked polyester resin composition when said cooking utensil is heated to temperatures as high as about 450° F.

2. The process of claim 1 wherein said resin containing solution has up to about 25 percent by weight solids.

3. A process according to claim 1 wherein said cooking utensil formed in step (a) is heated to a temperature between about 200° and 325° F. prior to treatment with a non-aqueous resin containing solution in step (b).

4. A process according to claim 1 where said non-aqueous resin containing solution contains about 10 % by weight of said polyamide-imide and about 90% by weight N-methyl-2-pyrrolidone.

5. A method according to claim 1 wherein said polyamide-imide coating substantially covers both the interior and exterior of the walls of said cooking utensil.

* * * * *

UNITED STATES PATENT OFFICE
CERTIFICATE OF CORRECTION

Patent No. 3,821,015    Dated June 28, 1974

Inventor(s) ROBERT S. FEINBERG

It is certified that error appears in the above-identified patent and that said Letters Patent are hereby corrected as shown below:

Name of Assignee: Spelling wrong; should be

CRYPLEX INDUSTRIES, INC.

Signed and sealed this 8th day of October 1974.

(SEAL)
Attest:

McCOY M. GIBSON JR.
Attesting Officer

C. MARSHALL DANN
Commissioner of Patents